United States Patent
An et al.

(10) Patent No.: US 11,138,537 B2
(45) Date of Patent: Oct. 5, 2021

(54) DATA VOLUME-BASED SERVER HARDWARE SIZING USING EDGE CASE ANALYSIS

(71) Applicant: International Business Machines Corporation, Armonk, NY (US)

(72) Inventors: Yongli An, Markham (CA); Jesse F. Chen, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1425 days.

(21) Appl. No.: 14/489,045

(22) Filed: Sep. 17, 2014

(65) Prior Publication Data

US 2016/0078383 A1 Mar. 17, 2016

(51) Int. Cl.
*G06Q 10/06* (2012.01)
*G06F 9/50* (2006.01)
*G06F 11/34* (2006.01)

(52) U.S. Cl.
CPC ..... *G06Q 10/06315* (2013.01); *G06F 9/5038* (2013.01); *G06F 9/505* (2013.01); *G06F 11/3433* (2013.01)

(58) Field of Classification Search
USPC ....................................................... 705/7.25
See application file for complete search history.

(56) References Cited

U.S. PATENT DOCUMENTS

| | | | |
|---|---|---|---|
| 6,032,121 A | 2/2000 | Dietrich et al. | |
| 6,421,674 B1* | 7/2002 | Yoakum | H04L 29/06027 |
| 6,950,816 B1* | 9/2005 | Quernemoen | G06F 9/5061 |
| 7,350,186 B2 | 3/2008 | Coleman et al. | |
| 7,415,453 B2 | 8/2008 | Suzuki et al. | |
| 7,752,070 B2* | 7/2010 | Hatcher | G06Q 10/063 705/7.11 |

(Continued)

FOREIGN PATENT DOCUMENTS

| | | |
|---|---|---|
| JP | 24-039829 A | 9/2013 |
| WO | 2012082726 A3 | 6/2012 |

OTHER PUBLICATIONS

Cherkasova L., Kotov V., Rokicki T., On Scalable Net Modeling of OLTP, 1993, Proceedings of 5th International Workshop on Petri Nets and Performance Models, pp. 270-279 (Year: 1993).*

(Continued)

*Primary Examiner* — Johnna R Loftis
*Assistant Examiner* — Sara Grace Brown
(74) *Attorney, Agent, or Firm* — Anthony V England; Edell, Shapiro & Finnan, LLC

(57) ABSTRACT

Customer data volume of a database and estimated transaction throughput requirements for a multi-tiered transaction system are received at a server sizing computing device. The customer data volume is compared to the estimated transaction throughput requirements. Based upon the comparison of the customer data volume to the estimated transaction throughput requirements, a customer data volume edge case for which server hardware is improperly sized by transaction-based hardware sizing is detected. Using the customer data volume, a quantity of operational memory of a server sufficient to store the customer data volume generated under the detected customer data volume edge case during real-time transactional processing by the server is calculated.

20 Claims, 4 Drawing Sheets

(56) References Cited

U.S. PATENT DOCUMENTS

| | | | |
|---|---|---|---|
| 7,774,225 B2 | 8/2010 | Cargille et al. | |
| 8,270,410 B2* | 9/2012 | Rogers | H04L 43/16 370/395.21 |
| 8,423,344 B1 | 4/2013 | Saghier et al. | |
| 8,516,488 B1 | 8/2013 | Brown et al. | |
| 9,229,845 B1* | 1/2016 | Chandrasekharapuram | G06F 11/3692 |
| 9,419,857 B1* | 8/2016 | Ryan | H04L 63/08 |
| 9,495,430 B2* | 11/2016 | Rajendran | G06F 17/30374 |
| 9,674,108 B1* | 6/2017 | Ryan | H04L 47/70 |
| 2002/0099521 A1 | 7/2002 | Yang et al. | |
| 2003/0050817 A1 | 3/2003 | Cargille et al. | |
| 2003/0050870 A1 | 3/2003 | Cargille et al. | |
| 2003/0225563 A1* | 12/2003 | Gonos | G06Q 10/06 703/22 |
| 2005/0080639 A1* | 4/2005 | Tang | G06F 9/5044 705/7.39 |
| 2005/0149940 A1* | 7/2005 | Calinescu | G06F 9/5061 718/104 |
| 2006/0074970 A1* | 4/2006 | Narayanan | G06F 11/3419 |
| 2006/0089922 A1* | 4/2006 | Flores | G06F 9/5005 705/500 |
| 2006/0190243 A1* | 8/2006 | Barkai | G06F 17/30486 704/8 |
| 2006/0235664 A1 | 10/2006 | Vinberg et al. | |
| 2007/0073576 A1 | 3/2007 | Connors et al. | |
| 2007/0220152 A1* | 9/2007 | Jackson | G06F 9/5027 709/226 |
| 2008/0177975 A1* | 7/2008 | Kawamura | G06F 16/2282 711/173 |
| 2008/0228459 A1* | 9/2008 | Jiang | H04L 41/145 703/13 |
| 2008/0244606 A1* | 10/2008 | Wylie | G06F 9/5038 718/104 |
| 2009/0172689 A1* | 7/2009 | Bobak | G06F 9/5061 718/104 |
| 2009/0182605 A1* | 7/2009 | Lappas | G06Q 10/06 705/34 |
| 2009/0307036 A1* | 12/2009 | Archer | G06F 1/3203 713/320 |
| 2010/0036698 A1* | 2/2010 | Garrison | G06Q 10/06 705/16 |
| 2010/0161372 A1* | 6/2010 | Brown | G06Q 10/06311 705/7.13 |
| 2010/0241477 A1* | 9/2010 | Nylander | G06F 17/5004 705/7.27 |
| 2010/0318637 A1* | 12/2010 | Ly | G06F 9/5083 709/221 |
| 2010/0325419 A1* | 12/2010 | Kanekar | H04L 63/0823 713/151 |
| 2011/0154471 A1* | 6/2011 | Anderson | G06F 9/54 726/11 |
| 2011/0191759 A1 | 8/2011 | Andrade et al. | |
| 2011/0196908 A1 | 8/2011 | Sukthankar et al. | |
| 2011/0231301 A1* | 9/2011 | Mclean | G06Q 40/04 705/37 |
| 2011/0296021 A1* | 12/2011 | Dorai | G06F 9/5072 709/226 |
| 2012/0254804 A1* | 10/2012 | Sheha | H04M 1/724 715/834 |
| 2012/0317249 A1* | 12/2012 | Salsburg | G06F 9/5072 709/220 |
| 2013/0024494 A1* | 1/2013 | Guarrieri | G06F 9/5061 709/203 |
| 2013/0046665 A1* | 2/2013 | Zabawskyj | H04L 12/14 705/34 |
| 2013/0060933 A1* | 3/2013 | Tung | G06F 11/3495 709/224 |
| 2013/0080635 A1* | 3/2013 | Ho | H04L 67/32 709/225 |
| 2013/0117157 A1* | 5/2013 | Iyoob | G06Q 30/06 705/26.41 |
| 2013/0185488 A1* | 7/2013 | Talagala | G06F 12/0246 711/103 |
| 2013/0191534 A1 | 7/2013 | Neuse et al. | |
| 2013/0226551 A1 | 8/2013 | Wasser | |
| 2013/0268375 A1* | 10/2013 | Isbister | G06F 17/30424 705/14.71 |
| 2014/0025519 A1* | 1/2014 | Thomas | G06F 8/61 705/21 |
| 2014/0036677 A1* | 2/2014 | Draznin | H04L 67/1012 370/235 |
| 2014/0052841 A1* | 2/2014 | Kanemasa | G06F 11/3419 709/224 |
| 2014/0215177 A1* | 7/2014 | Kim | G06F 1/3275 711/171 |
| 2014/0304499 A1* | 10/2014 | Gopinath | H04L 63/168 713/151 |
| 2014/0344326 A1* | 11/2014 | Kamath | H04L 67/1008 709/203 |
| 2014/0359356 A1* | 12/2014 | Aoki | G06F 11/1441 714/24 |
| 2015/0039763 A1* | 2/2015 | Chaudhary | H04L 47/125 709/226 |
| 2015/0169467 A1* | 6/2015 | Chase | G06F 16/9014 711/216 |
| 2015/0281113 A1* | 10/2015 | Siciliano | G06F 9/505 709/226 |
| 2016/0077920 A1* | 3/2016 | Regni | G06F 17/30575 707/649 |

OTHER PUBLICATIONS

Bruni P. Avigad R., Martin J., IMS 12 Selected Performance Topics, Jan. 2013, IBM, pp. 7-11, 285 (Year: 2013).*

Sugato Bagchi, et al., Capacity Planning Tools for Web and Grid Environments, Proceedings of the 1st International Conference on Performance Evaluation Methodologies and Tools (Valuetools '06), Oct. 11, 2006, pp. 1-10, Association for Computing Machinery, Pisa, Italy.

Author Unknown, Wikipedia: Master data management, Webpage/site, Aug. 11, 2014, pp. 1-5, Wikimedia Foundation, Inc., Published online at: http://en.wikipedia.org/wiki/Master_data_management.

\* cited by examiner

DATA VOLUME-BASED SERVER HARDWARE SIZING USING EDGE CASE ANALYSIS

BACKGROUND

The present invention relates to hardware sizing for servers. More particularly, the present invention relates to data volume-based server hardware sizing using edge case analysis.

Server devices host server-side applications that may be used to process transactions over a network for users of client computing devices. Client-side applications, such as web browsers or database applications, executed by the client computing devices may access the server-side applications hosted by the server devices for informational or transactional purposes. For example, server devices and the hosted server-side applications may provide transaction processing services for online websites associated with product purchases or informational acquisition by users of client-side web browser applications, database applications, and other forms of client-side applications.

BRIEF SUMMARY

A method includes receiving, at a server sizing computing device, customer data volume of a database and estimated transaction throughput requirements for a multi-tiered transaction system; comparing the customer data volume to the estimated transaction throughput requirements; detecting, based upon the comparison of the customer data volume to the estimated transaction throughput requirements, a customer data volume edge case for which server hardware is improperly sized by transaction-based hardware sizing; and calculating, using the customer data volume, a quantity of operational memory of a server sufficient to store the customer data volume generated under the detected customer data volume edge case during real-time transactional processing by the server.

A system includes an input device; and a processor programmed to: receive, via the input device, customer data volume of a database and estimated transaction throughput requirements for a multi-tiered transaction system; compare the customer data volume to the estimated transaction throughput requirements; detect, based upon the comparison of the customer data volume to the estimated transaction throughput requirements, a customer data volume edge case for which server hardware is improperly sized by transaction-based hardware sizing; and calculate, using the customer data volume, a quantity of operational memory of a server sufficient to store the customer data volume generated under the detected customer data volume edge case during real-time transactional processing by the server.

A computer program product includes a computer readable storage medium having computer readable program code embodied therewith, where the computer readable program code when executed on a computer causes the computer to: receive customer data volume of a database and estimated transaction throughput requirements for a multi-tiered transaction system; compare the customer data volume to the estimated transaction throughput requirements; detect, based upon the comparison of the customer data volume to the estimated transaction throughput requirements, a customer data volume edge case for which server hardware is improperly sized by transaction-based hardware sizing; and calculate, using the customer data volume, a quantity of operational memory of a server sufficient to store the customer data volume generated under the detected customer data volume edge case during real-time transactional processing by the server.

DETAILED DESCRIPTION

Figure 1:
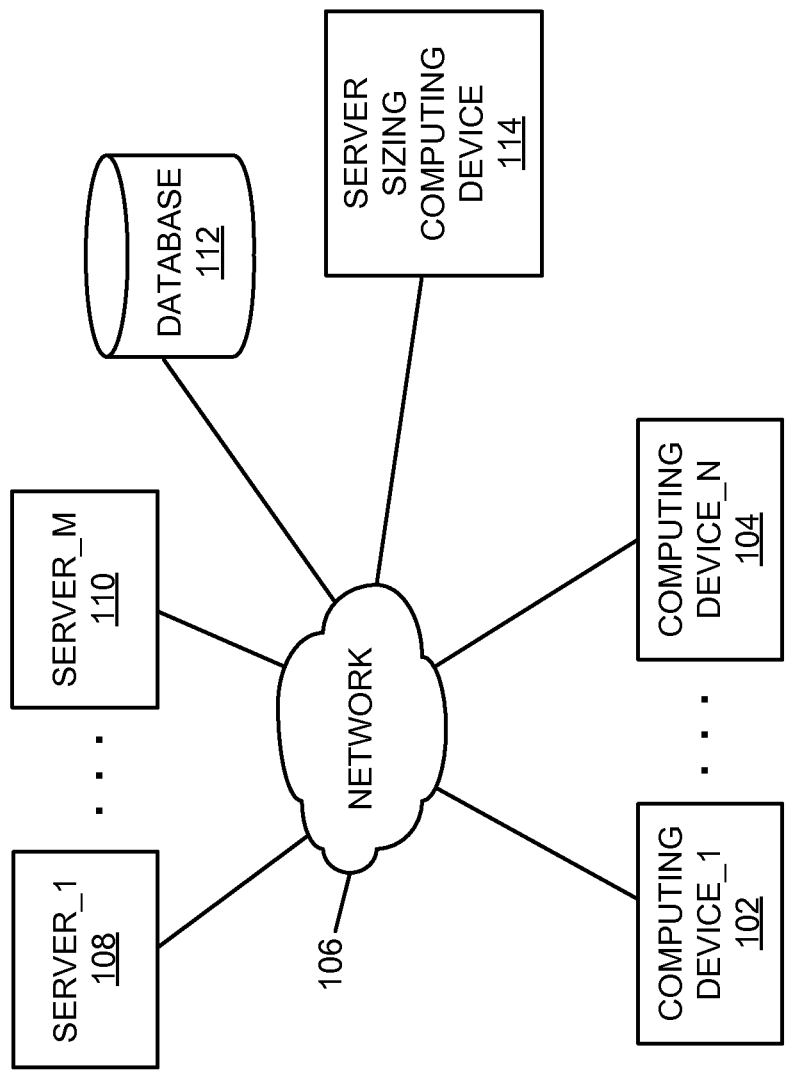
FIG. 1 is a block diagram of an example of an implementation of a system for data volume-based server hardware sizing using edge case analysis according to an embodiment of the present subject matter.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides data volume-based server hardware sizing using edge case analysis. The present subject matter utilizes data volume (e.g., customer data volume) under certain real-time server operational conditions to calculate memory (e.g., RAM) sizing and central processing unit (CPU) sizing for the server. The present technology considers how many "member" or "user" records may be opened at once/concurrently in terms of data volume (e.g., real-time data in RAM and processed by CPU resources) during database transactions by the members/parties. The present technology improves real-time server operational hardware sizing in recognition of the fact that the number of concurrently-opened member records directly affects the real-time utilization of the server operational memory and CPU processing resources. The approach described herein correlates/links how many member records may be cached inside the server operational memory and processed by CPU resources under circumstances that previous hardware sizing approaches (e.g., transactions per second (TPS-based or transaction-based) sizing approaches) do not consider. As such, the use of data volume for hardware sizing calculations described herein may improve real-time operational performance and real-time processing capabilities for a server relative to the previous approaches to server operational hardware sizing.

As described in more detail below, memory (e.g., RAM) and processor (e.g., CPU) considerations for a database server are correlated/linked to a workload that is expected of the database server in terms of real-time data volume. For a database workload, an application sends a mixture of structured query language (SQL) queries to the database. These queries involve access and interaction with what is referred to as a "member" table for the respective customer/user. A "member" within this context represents a particular user (alternatively termed a "party" or "parties" in plural herein) of the data repository. Data repository management entities provide the core functionality to match members with open records and to identify duplicate records so the duplicate records may be removed or consolidated to create a set of "golden" records for the particular member. Examples of golden records include records that an insurance company or a bank holds for a particular person/customer.

The present technology determines hardware capacity requirements for certain "edge case" usage scenarios associated with such a data repository. Consideration of the number of customers/users, the data volume per transaction (with respect to CPU and computer RAM determinations), and the cumulative resulting data volume provides a technological improvement in server hardware sizing calculations.

The terms "edge case," "customer data volume edge case," and similar terms as utilized herein refer to data volume-based operational conditions that result from disparate quantities of users in terms of transactions per second (TPS) relative to real-time data volume (e.g., data processed by CPU resources and real-time data volume in operational memory/RAM). An edge case is considered and defined for purposes of the present description to be a data volume condition that results in hardware sizing requirements (e.g., CPU and memory/RAM) that may only be effectively calculated by using the actual real-time data volume in operational memory/RAM and the actual real-time data volume processed by CPU resources.

For example, an edge case may exist for a situation with a very light TPS workload (e.g., only one to two concurrent users of a server-based database application) with a very large total volume of customer data records (e.g., three hundred million data records with only ten (10) TPS as the throughput requirement). This edge case is referred to as a "low-TPS/high-data volume" edge case, and represents a low number of user transactions or "hits" against a data repository containing a large number of customer records. Another example edge case is a high-TPS/low-data volume edge case, and represents a very high number of user transactions or "hits" against a data repository containing a relatively small number of customer records. Each of these and other forms of edge cases result in CPU and RAM hardware capacity requirements that differ from hardware capacity requirements that would be identified using previous hardware capacity planning technologies.

The term "hardware capacity planning" or "transactional hardware capacity planning" as used herein represents a determination of a number of real-time transactional processing hardware components that are planned/implemented to manage transactional volume. For example, a determination of a number of central processing units (CPUs) and a quantity of random access memory (e.g., RAM—"memory" or "operational memory") to be implemented for real-time transactional processing represents transactional hardware capacity planning.

The processing described herein for hardware capacity planning (based upon data volume) is distinguished herein and is considered different from planning for data storage requirements (e.g., disk drives). Storage of accessed and/or processed data, that is accessed in association with or that results from real-time transactional processing, may be implemented for example within a data repository.

The present technology enhances previous technologies used for hardware capacity planning by utilizing the number of customers (e.g., collective/aggregate data volume) associated with a given data repository to evaluate and specify hardware capacity planning of the real-time transactional components (e.g., CPU and RAM). The present technology for hardware capacity planning in accordance with the number of customers in terms of data volume operates in recognition that the data volume per transaction consumes real-time CPU bandwidth and consumes real-time operational memory.

The hardware capacity planning described herein is further distinguishable from a traditional concept of transactions per second (TPS) because the traditional concept of a quantity of transactions per second does not consider the resulting data volume associated with any of the transactions, and as such does not consider the collective/aggregate data volume that results from multiple such transactions. As such, the present technology leverages information that was previously not utilized or recognized to have an impact on hardware sizing. The present technology recognizes the impact that the data volume associated with transactions has on the real-time capabilities of server hardware, and improves the server hardware sizing to further improve real-time processing of transactions in a more-efficient manner.

It should be understood that the present technology may be applied to any form of data repository where customer data records and transactions are processed. For example, the present technology may be applied to a Master Data Management (MDM) repository, a retail product management and sales repository, or other customer-based transaction repository.

To assist with a description and understanding of the new technology associated with the data volume-based hardware sizing described herein, a traditional "lab test" transaction-based (baseline) method is understood to be based solely upon on transactions per second (TPS) as the main factor used to calculate hardware requirements without any consideration for data volume. The present technology differs from the traditional baseline transaction-based server hardware sizing method in that the present technology utilizes edge condition detection in combination with database volume factors to calculate hardware requirements that more accurately capture the real-time processing resource requirements of the server.

Prior to describing details of the present technology for data volume-based server hardware sizing using edge case analysis, a brief description of the traditional baseline transaction-based server hardware sizing method is provided to differentiate the present technology, which is described in detail after the brief description of the traditional method.

The traditional baseline transaction-based server hardware sizing is considered a "TPS-based" (baseline) methodology that yields a CPU core-count requirement. Based upon the calculated CPU core-count requirement, the number of CPUs may be computed. Where there is more than one core per CPU, the number of CPUs may be calculated by dividing the calculated CPU core-count requirement by the number of cores per CPU. Additionally, the calculated CPU core-count requirement further facilitates computation of a RAM requirement that is based upon lab test results of RAM requirements per CPU core. Using twelve gigabytes of RAM per core (12 GB RAM/core) as an example of a lab test result, ten (10) TPS may yield in lab testing a result of one (1) core for the CPU core-count requirement. From that, one (1) CPU is specified irrespective of cores per CPU, and the RAM is fixed at twelve gigabytes (e.g., 1 core*12 GB=12 GB). Further, 100 TPS may yield a result of sixteen (16) cores for the CPU core-count requirement. From that, four (4) CPUs may be specified based upon processors with four (4) cores per CPU, and the RAM is fixed at one hundred and ninety two gigabytes (e.g., 16 cores*12 GB=192 GB).

As described above, the traditional baseline transaction-based server hardware sizing approach does not consider the data volume and may result in hardware sizing that does not properly manage the edge cases that are considered herein. The present technology applies data volume considerations to the determination of RAM and CPU calculations, as described above and in more detail below, to improve real-time hardware sizing calculations and the resulting processing capabilities of a server that operates under the respective edge cases.

The new technology described herein provides a series of threshold checks for known edge cases/conditions. Three edge cases exist for operational memory, and one edge case also exists for CPU determinations. The following examples represent edge conditions that are defined for purposes of the present description and the respective corresponding sizing adjustments. It should be noted that other edge conditions may be defined as appropriate for the given implementation, and that the present technology may be adapted to any such implementation without departure from the scope of the present subject matter.

For purposes of the edge condition examples that follow, 250 TPS or greater (e.g., >=250 TPS) may be considered to be an example of a high transaction rate per second (high-TPS). Alternatively, 15 TPS or lower (e.g., <=15 TPS) may be considered to be a low transaction rate per second (low-TPS). Further, one hundred million (100M) party/member records or greater (e.g., >=100M records per party) may be considered to create a situation with a high data volume based upon the number/size of customer records, and two million (2M) party/member records or lower (e.g., <=2M records per party) may be considered to create a situation with a low data volume, again based upon the number/size of customer records.

Edge condition one (#1) is defined as a high transaction per second (high-TPS) with low data volume. Within edge condition (1), using conventional TPS-based (baseline) calculations, the server RAM sizing calculation may yield a result that is greater than the database size itself. In such a situation, the present technology may set/adjust the server operational memory size that is specified by the TPS-based calculations to the database size (e.g., MEM=DB size). In other words, if the database size is, for example, sixty-four gigabytes (64 GB) in size, then even if the entire database is cached within operational memory, specification of considerably more operational memory (e.g., 149 GB as observed with certain previous methods) would be an unreasonable over-expenditure for this particular edge case. Edge condition one (#1) does not apply herein to CPU determinations.

Edge condition two (#2) is defined as a relatively low TPS with low data volume. Within edge condition (2), using conventional TPS-based (baseline) calculations, the server RAM sizing calculation may yield a result that is less than sixteen gigabytes (<16 GB). In such a situation, the present technology may set/adjust the operational memory size that is specified by the TPS-based calculations to sixteen gigabytes (e.g., MEM=16 GB). This may be understood by realizing that a certain threshold amount of operational memory may be considered minimally sufficient to operate database and middleware software. Edge condition two (#2) also does not apply herein to CPU determinations.

Edge condition three (#3) is defined as low TPS with high data volume. Within edge condition (3), using conventional TPS-based (baseline) calculations, the database RAM sizing calculation may yield a result that is less than ten percent of the database size (e.g., RAM <(10% of DB)). In such a situation, the present technology may apply scaling factors to customer data volume for memory and CPU calculation to more efficiently and appropriately specify the sizing of the memory and CPU. Under this edge condition three (#3) the values that result from the TPS baseline transaction-based server hardware sizing calculations are replaced with data volume-based calculations. Edge condition three (#3) may be applied herein to both memory and CPU determinations.

Using the present technology for operational memory determinations based upon the application of edge condition three (#3), the scaling factor calculation includes a "volume" factor of RAM per million customer records (e.g., RAM/Million customer records) with a scaled RAM adjustment factor, as shown in the following pseudo code:

```
IF edge_condition (#3) = true
    MEM = customer records * (RAM / Million
    customer records) * RAMAdjustmentFactor;
ELSE //Not an edge case, use lab-test-results-driven RAM value
    MEM = <RAM derived from traditional lab test results - TPS>
```

The "RAMAdjustmentFactor" for this edge condition three (#3) may be determined using several conditions based upon the number of customer records and the associated data volumes. Though the present examples utilize designated percentages, these values may be specified as appropriate for a given implementation. The specifications below are provided in increments of one hundred million customer records, though other ranges may be specified as appropriate for a given implementation.

For one hundred million customer records or lower (e.g., <=100M parties), the RAMAdjustmentFactor is set to thirty percent (30%). For one billion, one hundred million customer records or greater (e.g., >=1.1 B parties), the RAMAdjustmentFactor is set to ten percent (10%). For a range of customer records between these two extremes, a scaling factor is applied to calculate the intermediate RAMAdjustmentFactor. As such, for one hundred million customer records up to one billion, one hundred million customer records (e.g., 100M-1.1 B customer records), the RAMAdjustmentFactor is scaled between the thirty percent (30%) specified above down to ten percent (10%) also specified above with a decrease of two percent (-2%) for every additional one hundred million customer records (e.g., 30%-10% scaling between 100M and 1.1 B).

Using this scaling factor of a two percent decrease (-2%) in the RAMAdjustmentFactor for every additional one hundred million customer records, for a quantity of two hundred million customer records (e.g., 200M customer records), the RAMAdjustmentFactor is scaled to twenty eight percent (e.g., 30%-2% for the first additional one million customer records over 100M customer records). Similarly, for three hundred million customer records (e.g., 300M customer records), the RAMAdjustmentFactor is scaled to twenty six percent (e.g., 30%-4% for the second additional one million customer records over 100M customer records). This scaling of the RAMAdjustmentFactor continues for each additional one million customer records (e.g., for 400M customer records the RAMAdjustmentFactor=30-6%=24%, for 500M customer records the RAMAdjustmentFactor=30-8%=22%, for 600M customer records the RAMAdjustmentFactor=30-10%=20%, for 700M customer records the RAMAdjustmentFactor=30-12%=18%, for 800M customer records the RAMAdjustmentFactor=30-14%=16%, for 900M customer records the RAMAdjustmentFactor=30-16%=14%, for 1 B customer records the RAMAdjustmentFactor=30-18%=12%, and for 1.1 B customer records and up the RAMAdjustmentFactor=30-20%=10%).

In view of the examples above, the present technology applies a linear scaling factor of between thirty percent (30%) down to ten percent (10%) as the number of customer records increases linearly. The present technology is based upon knowledge that the database storage per customer/party may be calculated because the storage per party for a given product (e.g., "Master Data Management," or "MDM") is defined by a set of fixed-size tables. Using this particular product as an example, ten gigabytes of RAM per million customer records (10 GB/Million customer records) provides ample headroom in RAM to avoid memory starvation.

Applying this linear scaling to edge case (#3) described above, and taking ten gigabytes of RAM per million customer records (10 GB RAM/Million customer records) as an example, the following Table (1) has been derived based upon the example pseudo code above.

TABLE (1)

RAM Adjustment Factor Calculations

| Customer Record Count | Edge Condition #3 | Memory |
|---|---|---|
| 100 Million | 100M * 10 GB/M * 30% | 300 GB |
| 200 Million | 200M * 10 GB/M * 28% | 560 GB |
| 300 Million | 300M * 10 GB/M * 26% | 780 GB |
| 400 Million | 400M * 10 GB/M * 24% | 960 GB |
| 500 Million | 500M * 10 GB/M * 22% | 1.1 TB |
| 600 Million | 600M * 10 GB/M * 20% | 1.2 TB |
| 700 Million | 700M * 10 GB/M * 18% | 1.26 TB |
| 800 Million | 800M * 10 GB/M * 16% | 1.28 TB |
| 900 Million | 900M * 10 GB/M * 14% | 1.26 TB |
| 1 Billion | 1000M * 10 GB/M * 12% | 1.2 TB |
| 1.1 Billion | 1100M * 10 GB/M * 10% | 1.1 TB |
| 1.2 Billion | 1200M * 10 GB/M * 10% | 1.2 TB |
| 1.3 Billion | 1300M * 10 GB/M * 10% | 1.3 TB |
| 1.4 Billion | 1400M * 10 GB/M * 10% | 1.4 TB |
| ... | ... | ... |

As can be seen from Table (1) above, the RAM calculation increases until a count of eight hundred million (800M) customer records is reached and decreases moderately thereafter until a count of one point three billion customer records (1.2 B) is reached, at which point the RAM calculation again begins increasing in a reasonably proportionally manner relative to the increase in the number of customer records. This decrease in this range may be considered relatively moderate in view of the observation that eighty-five percent (85%) of utilizations within a given system may generally be considered full to the extent that the decrease may not impact actual performance. However, the actual value of RAM selected in this range may be specified to remain at a level of a previous calculation if the actual result at a given increment of customer records is a decrease from the previous calculation until the result of the calculation is observed to again increase. As such, for the range of nine hundred million (900M) customer records until one point two billion customer records (1.2 B), the RAM may be held at one point two six terabytes (1.26 TB), after which the RAM may again be specified to increase. In this manner, the RAM calculation may be smoothed to account for this moderate decrease.

Processor (CPU) capacity determinations may be based upon the application of edge condition three (#3) as well. It may be observed that while one (1) CPU may be sufficient for a relatively small database, as in the case for a low TPS/low data volume, one (1) CPU would not necessarily be adequate when a database is large. Further, sorts, joins, and query optimization processing may consume additional CPU cores even where there is a low transaction rate in a very large database. Applying the edge cases considered herein and using the present technology, the number of CPU cores may also be adjusted according to the size of the database memory requirement, which again is correlated with the number of customer records.

For CPU determinations using the present technology based upon application of edge condition three (#3), the scaling factor calculation includes a "volume" factor of CPU per million customer records (e.g., CPU/Million customer records) with a scaled CPU adjustment factor. For purposes of example, a five percent (5%) increase in CPU for every ten million (10M) in customer data volume, aggregated to a value of fifty percent (50%) per one hundred million (100M) in customer data volume beyond the first one hundred million (100M) in customer data volume, is utilized for purposes of example, though this value may be adjusted as appropriate for a given implementation. The "CPUAdjustmentFactor (VOLUME)" may be considered adjusted beyond the first one hundred million (100M) in customer data volume, as a fifty percent (50%) increase per one hundred million (100M) in customer data volume multiplied by the increase in volume, in terms of hundreds of millions, over one hundred million (100M), as shown in the following pseudo code:

```
IF edge_condition (#3) = true
    CPU = BASECPU(TPS) * (1 + CPUAdjustmentFactor(VOLUME))
ELSE
    CPU = BASECPU(TPS)
Where CPUAdjustmentFactor(VOLUME) = ((50% / 100M) * Volume in
Hundred Millions beyond 100M)
```

For purposes of the present description, it may be assumed that a base CPU specification for traditional calculations may be adjusted by the present technology based upon a "CPUAdjustmentFactor" that is volume related. The "CPUAdjustmentFactor" for this edge condition three (#3) may be determined based upon the customer data volumes generated by the number of customer records. With the value of fifty percent (50%) utilized for the "CPUAdjustmentFactor" per one hundred million (100M) in customer data volume, and one CPU core specified for the "BASECPU (TPS)," the following table details CPU adjustments based upon customer data volume.

TABLE (2)

CPU Adjustment Factor Calculations

| Customer Record Count | Edge Condition #3 | CPU Core count |
|---|---|---|
| 100 Million | 1 * (1 + 0%) | 1 |
| 200 Million | 1 * (1 + 50%) | 1.5 |
| 300 Million | 1 * (1 + 100%) | 2 |
| 400 Million | 1 * (1 + 150%) | 2.5 |
| 500 Million | 1 * (1 + 200%) | 3 |
| 600 Million | 1 * (1 + 250%) | 3.5 |

TABLE (2)-continued

CPU Adjustment Factor Calculations

| Customer Record Count | Edge Condition #3 | CPU Core count |
|---|---|---|
| 700 Million | 1 * (1 + 300%) | 4 |
| 800 Million | 1 * (1 + 350%) | 4.5 |
| 900 Million | 1 * (1 + 400%) | 5 |
| 1 Billion | 1 * (1 + 450%) | 5.5 |
| 1.1 Billion | 1 * (1 + 500%) | 6 |
| 1.2 Billion | 1 * (1 + 550%) | 6.5 |
| 1.3 Billion | 1 * (1 + 600%) | 7 |
| 1.4 Billion | 1 * (1 + 650%) | 7.5 |
| . . . | . . . | . . . |

As such, as can be seen from Table (2) above, the quantity of CPU cores may be calculated using a percentage-based scaling of a CPU core count that increments based upon the number of customer records. It should be noted that half cores do not exist, so the calculations above may be rounded to the next higher core size/count for selection of CPUs/cores to satisfy the respective CPU adjustments. Further, multiple core processors may be utilized (e.g., four cores per CPU), and in such cases, the number of cores calculated may be divided into the core count per multi-core processor to arrive at the number of processor devices to specify.

It should be noted that conception of the present subject matter resulted from recognition of certain limitations associated with previous technology to size hardware for servers. For example, it was observed that previous hardware sizing calculations are based upon a capacity planning estimate of server hardware for a given workload using a stack of applications that are running on a given computational infrastructure. The previous techniques for performing capacity planning for the applications running on a computational infrastructure include instrumenting the application under development (e.g., adding instrumentation code) to determine a set of baseline reference numbers that relate to performance under the instrumented conditions. It was observed that a formula is derived under previous technologies from these baseline reference numbers, and that the derived formula is used to estimate hardware sizing parameters, such as central processing unit (CPU) and random access memory (RAM—memory) requirements. However, it was further observed that the previous "instrumentation and formula" approach has limitations because the test environments used to derive the baseline reference numbers result in baseline references numbers that are limited to the types of transactions and data sizes processed during development to arrive at the baseline numbers, and as such omit all other use-case situations. It was determined that there are two fundamental problems with the previous "instrumentation and formula" approach to server hardware sizing. The first determined problem with the previous "instrumentation and formula" approach is that "edge cases" are not handled properly by such an approach. An example edge case is where a very light workload (e.g., only one to two concurrent users of an application) has a very large volume of customer data records (e.g., three hundred million data records, such as with an online sales website). Regarding such an edge case, the previous "instrumentation and formula" approach was observed to under-size the CPU and memory requirements because the workload is too small and the actual volume of data is ignored during instrumentation calculations. The second determined problem with the previous "instrumentation and formula" approach is that it is impossible to instrument all possible user scenarios during product development, and deployment of instrumentation code results in lower performance for users of the deployed systems. As such, it was further determined that an approach to formal analysis of these edge cases was needed. Within the context of determining a new approach to formal analysis of edge cases, it was additionally determined that memory (e.g., RAM) and processor (e.g., CPU) considerations for a database server are correlated/linked to the workload that is expected of the database server, and that the workload is correlated to the how many member records will be processed concurrently by the CPU(s) and cached inside the database operational memory. The technology described herein provides a solution to sizing server hardware (e.g., CPU, RAM, etc.) under such edge cases so that the deployed hardware of the server is sufficiently sized to accommodate edge cases. The present subject matter improves server hardware sizing by providing for data volume-based server hardware sizing using edge case analysis, as described above and in more detail below. As such, improved server hardware sizing may be obtained through use of the present technology.

The data volume-based server hardware sizing using edge case analysis described herein may be performed in real time to allow prompt sizing evaluation for servers and data centers. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

FIG. 1 is a block diagram of an example of an implementation of a system 100 for data volume-based server hardware sizing using edge case analysis. A computing device_1 102 through a computing device_N 104 communicate via a network 106 with several other devices. The other devices include a server_1 108 through a server_M 110, and a database 112. The computing device_1 102 through the computing device_N 104 may be utilized by members/users that have tables/records in the database 112 that are accessed and processed by use of one or more of the server_1108 through the server_M 110. The system 100 may be considered a multi-tier transaction system for purposes of the present description, where client devices interact with server devices to perform transactions that involve data manipulations and workload processing.

A server sizing computing device 114 is illustrated and operates to perform programmatic calculations based upon data volume (e.g., member count/record sizes) to specify hardware sizing for CPU and RAM for the server_1 108 through the server_M 110. The calculations may be performed in system on an executing server to evaluate, calculate, and plan upgrades to the server_1 108 through the server_M 110, or may be performed by input of intended data volumes for the server_1 108 through the server_M 110 when deployed. It should be noted that while the server sizing computing device 114 is illustrated as a separate component for purposes of example, the functionality of the server sizing computing device 114 may be implemented at any one or more of the computing device_1 102 through the computing device_N 104 and/or the server_1 108 through the server_M 110, as appropriate for a given implementation. As such, the present technology may be implemented at a user computing device or server device level. A variety of possibilities exist for implementation of the present subject matter, and all such possibilities are considered within the scope of the present subject matter.

As will be described in more detail below in association with FIG. 2 through FIG. 4, the server sizing computing device 114 (or its functional implementation within one of the other devices shown within FIG. 1) represents a new form of computing device and functionality that provides automated data volume-based server hardware sizing using edge case analysis. The automated data volume-based server hardware sizing using edge case analysis is based upon detection of edge cases related to data volume that result in memory and real-time CPU utilization that differs from traditional considerations for server hardware sizing. As described above, traditional approaches improperly size hardware due to a lack of recognition and a lack of consideration of data volume and resultant edge cases in hardware sizing calculations. The present technology may improve server hardware sizing by consideration of these edge cases and data volumes to specify server CPU and RAM sizes.

The network 106 may include any form of interconnection suitable for the intended purpose, including a private or public network such as an intranet or the Internet, respectively, direct inter-module interconnection, dial-up, wireless, or any other interconnection mechanism capable of interconnecting the respective devices.

The server_1 108 through the server_M 110 may include any device capable of providing data for consumption by a device, such as the computing device_1 102 through the computing device_N 104, via a network, such as the network 106. As such, the server_1 108 through the server_M 110 may each include a web server, application server, or other data server device.

The database 112 may include a relational database, an object database, or any other storage type of device. As such, the database 112 may be implemented as appropriate for a given implementation.

Figure 2:
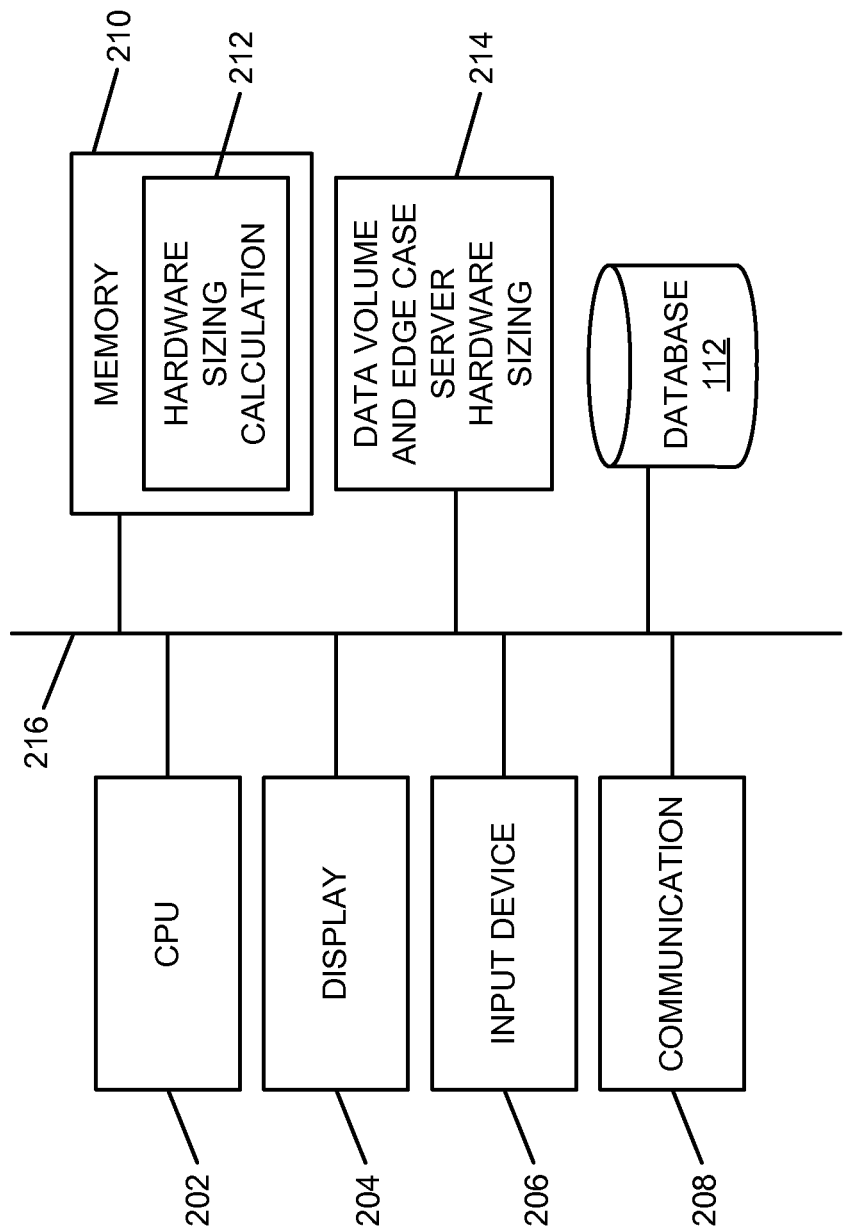
FIG. 2 is a block diagram of an example of an implementation of a core processing module capable of performing data volume-based server hardware sizing using edge case analysis according to an embodiment of the present subject matter.

FIG. 2 is a block diagram of an example of an implementation of a core processing module 200 capable of performing data volume-based server hardware sizing using edge case analysis. The core processing module 200 represents operational components of the server sizing computing device 114, and certain components may also be associated with one or more of the computing device_1 102 through the computing device_N 104, or with one or more of the server_1 108 through the server_M 110, as appropriate for a given implementation, including where one of these devices implement the functionality of the server sizing computing device 114. As such, the core processing module 200 is described generally herein, though it is understood that many variations on implementation of the components within the core processing module 200 are possible and all such variations are within the scope of the present subject matter.

Further, the core processing module 200 may provide different and complementary processing of server hardware sizing calculations in association with each implementation. As such, for any of the examples below, it is understood that any aspect of functionality described with respect to any one device that is described in conjunction with another device (e.g., sends/sending, etc.) is to be understood to concurrently describe the functionality of the other respective device (e.g., receives/receiving, etc.).

A central processing unit (CPU) 202 ("processor") provides hardware that performs computer instruction execution, computation, and other capabilities within the core processing module 200. A display 204 provides visual information to a user of the core processing module 200 and an input device 206 provides input capabilities for the user.

The display 204 may include any display device, such as a cathode ray tube (CRT), liquid crystal display (LCD), light emitting diode (LED), electronic ink displays, projection, touchscreen, or other display element or panel. The input device 206 may include a computer keyboard, a keypad, a mouse, a pen, a joystick, touchscreen, voice command processing unit, or any other type of input device by which the user may interact with and respond to information on the display 204.

It should be noted that the display 204 and the input device 206 may be optional components for the core processing module 200 for certain implementations/devices, or may be located remotely from the respective devices and hosted by another computing device that is in communication with the respective devices. Accordingly, the core processing module 200 may operate as a completely automated embedded device without direct user configurability or feedback. However, the core processing module 200 may also provide user feedback and configurability via the display 204 and the input device 206, respectively, as appropriate for a given implementation.

A communication module 208 provides hardware, protocol stack processing, and interconnection capabilities that allow the core processing module 200 to communicate with other modules within the system 100. The communication module 208 may include any electrical, protocol, and protocol conversion capabilities useable to provide interconnection capabilities, appropriate for a given implementation.

A memory 210 includes a hardware sizing calculation storage area 212 that stores input information, intermediate results, and final results for data volume-based server hardware sizing using edge case analysis within the core processing module 200. It is understood that the memory 210 may include any combination of volatile and non-volatile memory suitable for the intended purpose, distributed or localized as appropriate, and may include other memory segments not illustrated within the present example for ease of illustration purposes. For example, the memory 210 may include a code storage area, an operating system storage area, a code execution area, and a data area without departure from the scope of the present subject matter.

A data volume and edge case server hardware sizing module 214 is also illustrated. The data volume and edge case server hardware sizing module 214 provides processing capabilities for detection of edge cases and evaluation of data volumes associated with the detected edge cases for the core processing module 200, as described above and in more detail below. The data volume and edge case server hardware sizing module 214 implements the automated data volume-based server hardware sizing using edge case analysis of the core processing module 200.

It should also be noted that the data volume and edge case server hardware sizing module 214 may form a portion of other circuitry described without departure from the scope of the present subject matter. Further, the data volume and edge case server hardware sizing module 214 may alternatively be implemented as an application stored within the memory 210. In such an implementation, the data volume and edge case server hardware sizing module 214 may include instructions executed by the CPU 202 for performing the functionality described herein. The CPU 202 may execute these instructions to provide the processing capabilities described above and in more detail below for the core processing module 200. The data volume and edge case server hardware sizing module 214 may form a portion of an interrupt service routine (ISR), a portion of an operating system, a portion of a browser application, or a portion of a separate application without departure from the scope of the present subject matter.

The database 112 is again shown within FIG. 2 associated with the core processing module 200. As such, the database 112 may be operatively coupled to the core processing module 200 without use of network connectivity, as appropriate for a given implementation.

The CPU 202, the display 204, the input device 206, the communication module 208, the memory 210, the data volume and edge case server hardware sizing module 214, and the database 112 are interconnected via an interconnection 216. The interconnection 216 may include a system bus, a network, or any other interconnection capable of providing the respective components with suitable interconnection for the respective purpose.

Though the different modules illustrated within FIG. 2 are illustrated as component-level modules for ease of illustration and description purposes, it should be noted that these modules may include any hardware, programmed processor(s), and memory used to carry out the functions of the respective modules as described above and in more detail below. For example, the modules may include additional controller circuitry in the form of application specific integrated circuits (ASICs), processors, antennas, and/or discrete integrated circuits and components for performing communication and electrical control activities associated with the respective modules. Additionally, the modules may include interrupt-level, stack-level, and application-level modules as appropriate. Furthermore, the modules may include any memory components used for storage, execution, and data processing for performing processing activities associated with the respective modules. The modules may also form a portion of other circuitry described or may be combined without departure from the scope of the present subject matter.

Additionally, while the core processing module 200 is illustrated with and has certain components described, other modules and components may be associated with the core processing module 200 without departure from the scope of the present subject matter. Additionally, it should be noted that, while the core processing module 200 is described as a single device for ease of illustration purposes, the components within the core processing module 200 may be co-located or distributed and interconnected via a network without departure from the scope of the present subject matter. For a distributed arrangement, the display 204 and the input device 206 may be located at a point of sale device, kiosk, or other location, while the CPU 202 and memory 210 may be located at a local or remote server. Many other possible arrangements for components of the core processing module 200 are possible and all are considered within the scope of the present subject matter. It should also be understood that, though the database 112 is illustrated as a separate component for purposes of example, the information stored within the database 112 may also/alternatively be stored within the memory 210 without departure from the scope of the present subject matter. Accordingly, the core processing module 200 may take many forms and may be associated with many platforms.

Figure 3:
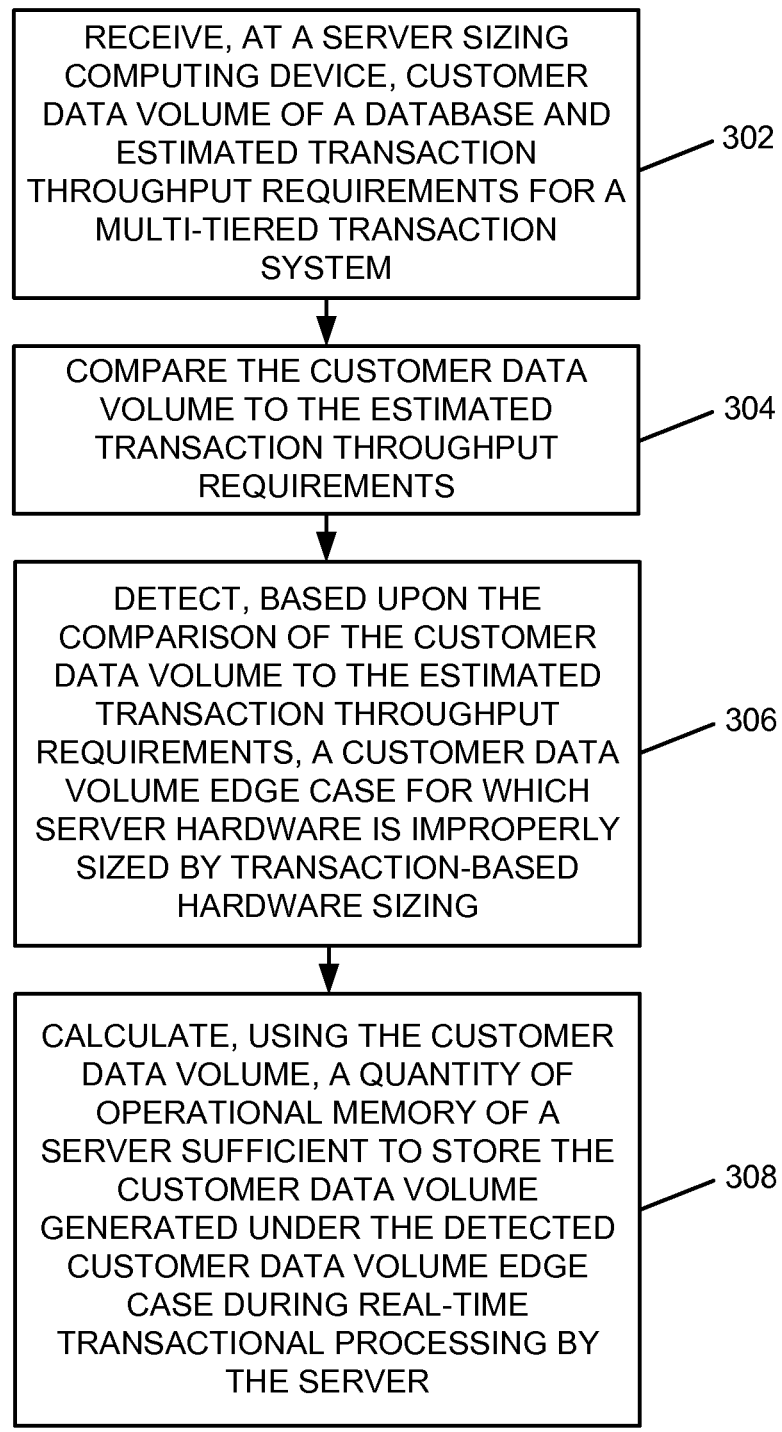
FIG. 3 is a flow chart of an example of an implementation of a process for data volume-based server hardware sizing using edge case analysis according to an embodiment of the present subject matter.
Figure 4:
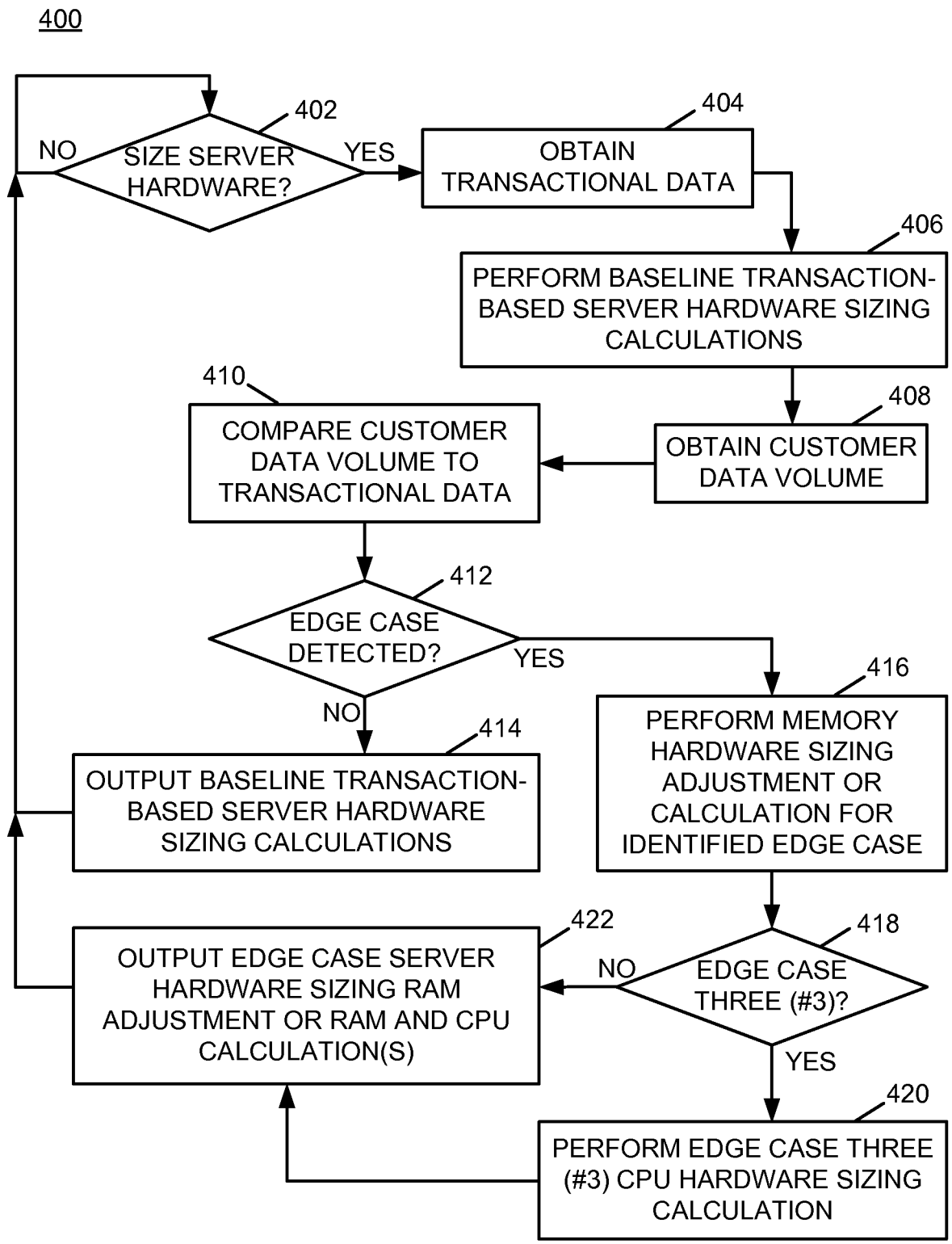
FIG. 4 is a flow chart of an example of an implementation of a process for data volume-based server hardware sizing using edge case analysis that computes both operational memory and central processing unit (CPU) sizing for a server according to an embodiment of the present subject matter.

FIG. 3 through FIG. 4 described below represent example processes that may be executed by devices, such as the core processing module 200, to perform the automated data volume-based server hardware sizing using edge case analysis associated with the present subject matter. Many other variations on the example processes are possible and all are considered within the scope of the present subject matter. The example processes may be performed by modules, such as the data volume and edge case server hardware sizing module 214 and/or executed by the CPU 202, associated with such devices. It should be noted that time out procedures and other error control procedures are not illustrated within the example processes described below for ease of illustration purposes. However, it is understood that all such procedures are considered to be within the scope of the present subject matter. Further, the described processes may be combined, sequences of the processing described may be changed, and additional processing may be added or removed without departure from the scope of the present subject matter.

FIG. 3 is a flow chart of an example of an implementation of a process 300 for data volume-based server hardware sizing using edge case analysis. At block 302, the process 300 receives, at a server sizing computing device, customer data volume of a database and estimated transaction throughput requirements for a multi-tiered transaction system. At block 304, the process 300 compares the customer data volume to the estimated transaction throughput requirements. At block 306, the process 300 detects, based upon the comparison of the customer data volume to the estimated transaction throughput requirements, a customer data volume edge case for which server hardware is improperly sized by transaction-based hardware sizing. At block 308, the process 300 calculates, using the customer data volume, a quantity of operational memory of a server sufficient to store the customer data volume generated under the detected customer data volume edge case during real-time transactional processing by the server.

FIG. 4 is a flow chart of an example of an implementation of a process 400 for data volume-based server hardware sizing using edge case analysis that computes both operational memory and central processing unit (CPU) sizing for a server. At decision point 402, the process 400 makes a determination as to whether a request to size server hardware has been detected. In response to determining that a request to size server hardware has been detected, the process 400 obtains customer transactional data at block 404. At block 406, the process 400 performs baseline transaction-based server hardware sizing calculations, such as by use of transactions per second. As described above, the baseline transaction-based server hardware sizing calculations may be adjusted in response to detection of certain edge conditions. As also described above, the edge conditions are related to real-time data volume considerations that are not effectively managed by baseline transaction-based server hardware sizing calculations. Further, as a result, the baseline transaction-based server hardware sizing calculations improperly size server hardware with a consequence of server performance degradation under the respective edge case conditions due to the respective real-time data volumes. As such, the present technology identifies these edge conditions and adjusts/increases the results of the baseline transaction-based server hardware sizing calculations based upon the respective real-time data volumes to increase server performance under the respective edge conditions.

To identify the respective edge conditions, the process 400 obtains customer data volume at block 408. At block 410, the process 400 compares the data volume to the transactional data.

At decision point 412, the process 400 makes a determination as to whether an edge case has been detected based upon the comparison of the data volume to the transactional data. An edge case as described herein may be considered a customer data volume edge case for which server hardware is improperly sized by traditional transaction-based hardware sizing. As described above, three edge cases are considered herein, though other edge cases may be defined and detected. It is understood that the present technology may be applied to any such edge case that may be detected based upon data volume considerations.

In response to determining at decision point 412 that an edge case has not been detected, the process 400 outputs the baseline transaction-based server hardware sizing calculations at block 414, and returns to decision point 402 and iterates as described above.

Returning to the description of decision point 412, in response to determining that an edge case has been detected, the process 400 performs a memory (RAM) hardware sizing adjustment or calculation for the respective detected edge case/condition at block 416. As described above, for edge condition one (#1) and two (#2), the input may include the baseline transaction-based server hardware sizing calculation for RAM, and the output may include an adjusted RAM calculation as specified for the respective edge case one (#1) and two (#2), as described in detail above. Alternatively, in response to a detection of edge case three (#3), a new RAM sizing calculation may be performed based upon the data volume, as described in detail above. As such, under edge case three (#3), the memory (RAM) hardware sizing calculation includes calculating, using the customer data volume, a quantity of operational memory of a server sufficient to store the customer data volume generated under the detected customer data volume edge case during real-time transactional processing by the server. Accordingly, all three edge cases may be processed differently for memory/RAM calculations, and the respective detected edge case adjustment or calculation may be performed as described above.

As also described in detail above, the edge case processing for hardware sizing utilizes data volume to perform the hardware sizing calculations for memory/RAM and for CPU in response to the detection of edge case/condition three (#3). As such, in response to completion of the respective RAM sizing adjustment or calculation at block 416, the process 400 makes a determination as to whether the detected edge case is edge case/condition three (#3) at decision point 418. With respect to hardware sizing calculations for memory/RAM, the processing at decision point 418 may be considered a portion of the processing at block 416 described above and the result may be retained rather than performed separately. As such, the decision point 418 is illustrated separately to reduce complexity within the drawing figure for branching to perform CPU hardware sizing calculations under edge case/condition three (#3).

To apply edge case/condition three (#3) to server hardware sizing for CPU determinations, in response to determining at decision point 418 that the detected edge case is edge case/condition three (#3), the process 400 performs a CPU hardware sizing calculation at block 420. The CPU sizing calculation includes calculating, using the customer data volume, a quantity of central processing unit (CPU) cores of a server sufficient to store the customer data volume generated under the detected customer data volume edge case during real-time transactional processing by the server, as described above.

In response to either performing the CPU hardware sizing calculation at block 420, or in response to determining at decision point 418 that the detected edge case is not edge case/condition three (#3), the process 400 outputs at block 422 either the edge case server hardware sizing memory/RAM adjustment (if edge case/condition #1 or #2 was detected and processed), or the data volume based calculations for both memory/RAM and CPU (if edge case/condition #3 was detected and processed). The process 400 returns to decision point 402 and iterates as described above As such, the process 400 provides hardware sizing for memory/RAM and CPU in response to detection of edge conditions. The hardware sizing for memory/RAM and CPU in response to detection of edge condition three (#3) utilizes data volume as the primary consideration for the respective hardware sizing calculations. The consideration of data volume may improve hardware sizing relative to traditional (baseline) transaction-per-second based calculations.

As described above in association with FIG. 1 through FIG. 4, the example systems and processes provide data volume-based server hardware sizing using edge case analysis. Many other variations and additional activities associated with data volume-based server hardware sizing using edge case analysis are possible and all are considered within the scope of the present subject matter.

Those skilled in the art will recognize, upon consideration of the above teachings, that certain of the above examples are based upon use of a programmed processor, such as the CPU 202. However, the invention is not limited to such example embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art based upon the teachings herein without departing from the scope and spirit of the invention. The subject matter was described to explain the principles of the invention and the practical application, and to enable others of ordinary skill in the art to understand the invention for various embodiments with various modifications as are suited to the particular use contemplated.

What is claimed is:

1. A method, comprising:
  receiving, by a server sizing computing device, customer data volume for a multi-tiered transaction system including a database with which a first server is being designed to operate during real time, and transaction throughput requirements for the multi-tiered transaction system that are specified to be supported during real-time transactional processing by the first server, wherein the customer data volume comprises a quantity of records concurrently open during database transactions by users;
  obtaining, by the server sizing computing device, a quantity of memory resources for the first server and a quantity of processing resources for the first server, wherein the quantity of memory resources and the quantity of processing resources for the first server are determined based on a quantity of transactions per a time interval;

detecting a customer data volume edge case for which at least the quantity of memory resources is improper from a plurality of customer data volume edge cases, wherein the plurality of customer data volume edge cases is defined by a number of transactions per second (TPS) and a number of concurrently open records, wherein the plurality of customer data volume edge cases is selected from a group consisting of:

a first customer data volume edge case containing at least 250 transactions per second (TPS) and a maximum of 2 million concurrently open records, a second customer data volume edge case containing a maximum of 15 transactions per second (TPS) and a maximum of 2 million concurrently open records, and a third customer data volume edge case containing a maximum of 15 transactions per second and at least 100 million concurrently open records, wherein the detecting comprises comparing the customer data volume and the transaction throughput requirements to the number of transactions per second (TPS) and the number of concurrently open records associated with the plurality of customer data volume edge cases;

calculating, using the customer data volume, a quantity of operational memory for the first server for the detected customer data volume edge case and modifying the quantity of memory resources for the first server based on the calculated operational memory, wherein the modified quantity of memory resources are to be implemented in the first server during the real-time transactional processing; and operating the first server for the detected customer data volume edge case with the modified quantity of memory resources.

2. The method of claim 1, where the detected customer data volume edge case comprises the third customer data volume edge case, and further comprising:

calculating a quantity of central processing unit (CPU) cores for the first server; and outputting the calculated quantity of CPU cores as an edge-case server hardware CPU sizing specification of the first server that is being designed to operate during real time with the database.

3. The method of claim 2, where the customer data volume comprises a number of customer records and where calculating the quantity of CPU cores for the first server comprises:

calculating the quantity of CPU cores for the first server using a percentage-based scaling of a CPU core count that increments based upon the number of customer records.

4. The method of claim 1, where the detected customer data volume edge case comprises the third customer data volume edge case, the customer data volume comprises a number of customer records, and where calculating the quantity of operational memory for the first server comprises:

calculating the quantity of operational memory for the first server using the customer data volume as the number of customer records multiplied by an amount of operational memory per million customer records multiplied by a RAMAdjustmentFactor, where the RAMAdjustmentFactor applies a decreasing percentage adjustment to the calculated quantity of operational memory as the customer data volume increases per million customer records.

5. The method of claim 4, where the decreasing percentage adjustment of the RAMAdjustmentFactor comprises a decreasing percentage adjustment to the calculated quantity of operational memory from thirty percent (30%) at one hundred million (100M) customer records down to ten percent (10%) as the customer data volume increases per hundred million customer records, and the RAMAdjustmentFactor remains constant at ten percent (10%) beginning with one point one billion (1.1B) customer records.

6. The method of claim 1, where the detected customer data volume edge case comprises the first customer data volume edge case, and where calculating the quantity of operational memory for the first server comprises:

determining that the quantity of memory resources for the first server is greater than a size of the database; and adjusting the quantity of memory resources to the size of the database.

7. The method of claim 1, where the detected customer data volume edge case comprises the second customer data volume edge case, and where calculating the quantity of operational memory for the first server comprises:

determining that the quantity of memory resources for the first server is less than sixteen gigabytes (<16 GB); and adjusting the quantity of memory resources to sixteen gigabytes.

8. A system, comprising:

an input device; and a processor of a server sizing computing device programmed to:

receive, via the input device, customer data volume for a multi-tiered transaction system including a database with which a first server is being designed to operate during real time, and transaction throughput requirements for the multi-tiered transaction system that are specified to be supported during real-time transactional processing by the first server, wherein the customer data volume comprises a quantity of records concurrently open during database transactions by users;

obtain a quantity of memory resources for the first server and a quantity of processing resources for the first server, wherein the quantity of memory resources and the quantity of processing resources for the first server are determined based on a quantity of transactions per a time interval;

detect a customer data volume edge case for which at least the quantity of memory resources is improper from a plurality of customer data volume edge cases, wherein the plurality of customer data volume edge cases is defined by a number of transactions per second (TPS) and a number of concurrently open records, wherein the plurality of customer data volume edge cases is selected from a group consisting of:

a first customer data volume edge case containing at least 250 transactions per second (TPS) and a maximum of 2 million concurrently open records, a second customer data volume edge case containing a maximum of 15 transactions per second (TPS) and a maximum of 2 million concurrently open records, and a third customer data volume edge case containing a maximum of 15 transactions per second and at least 100 million concurrently open records, wherein the detecting comprises comparing the customer data volume and the transaction throughput requirements to the number of transactions per second (TPS) and the number of concurrently open records associated with the plurality of customer data volume edge cases;

calculate, using the customer data volume, a quantity of operational memory for the first server for the detected customer data volume edge case and modify the quantity of memory resources for the first server based on the calculated operational memory, wherein the modified quantity of memory resources are to be implemented in the first server during the real-time transactional processing; and operate the first server for the detected customer data volume edge case with the modified quantity of memory resources.

9. The system of claim 8, where the detected customer data volume edge case comprises the third customer data volume edge case, and where the processor is further programmed to:

calculate a quantity of central processing unit (CPU) cores for the first server; and output the calculated quantity of CPU cores as an edge-case server hardware CPU sizing specification of the first server that is being designed to operate during real time with the database.

10. The system of claim 9, where the customer data volume comprises a number of customer records and where, in being programmed to calculate the quantity of CPU cores for the first server, the processor is programmed to:

calculate the quantity of CPU cores for the first server using a percentage-based scaling of a CPU core count that increments based upon the number of customer records.

11. The system of claim 8, where the detected customer data volume edge case comprises the third customer data volume edge case, the customer data volume comprises a number of customer records, and where, in being programmed to calculate the quantity of operational memory for the first server, the processor is programmed to:

calculate the quantity of operational memory for the first server using the customer data volume as the number of customer records multiplied by an amount of operational memory per million customer records multiplied by a RAMAdjustmentFactor, where the RAMAdjustmentFactor applies a decreasing percentage adjustment to the calculated quantity of operational memory as the customer data volume increases per million customer records.

12. The system of claim 11, where the decreasing percentage adjustment of the RAMAdjustmentFactor comprises a decreasing percentage adjustment to the calculated quantity of operational memory from thirty percent (30%) at one hundred million (100M) customer records down to ten percent (10%) as the customer data volume increases per hundred million customer records, and the RAMAdjustmentFactor remains constant at ten percent (10%) beginning with one point one billion (1.1B) customer records.

13. The system of claim 8, where the detected customer data volume edge case comprises the first customer data volume edge case, and where, in being programmed to calculate the quantity of operational memory for the first server, the processor is programmed to:

determine that the quantity of memory resources for the first server is greater than a size of the database; and adjust the quantity of memory resources to the size of the database.

14. A computer program product, comprising:

one or more computer readable storage media collectively having computer readable program code embodied therewith, where the computer readable program code when executed on a server sizing computer causes the server sizing computer to:

receive customer data volume for a multi-tiered transaction system including a database with which a first server is being designed to operate during real time, and transaction throughput requirements for the multi-tiered transaction system that are specified to be supported during real-time transactional processing by the first server, wherein the customer data volume comprises a quantity of records concurrently open during database transactions by users;

obtain a quantity of memory resources for the first server and a quantity of processing resources for the first server, wherein the quantity of memory resources and the quantity of processing resources for the first server are determined based on a quantity of transactions per a time interval;

detect a customer data volume edge case for which at least the quantity of memory resources is improper from a plurality of customer data volume edge cases, wherein the plurality of customer data volume edge cases is defined by a number of transactions per second (TPS) and a number of concurrently open records, wherein the plurality of customer data volume edge cases is selected from a group consisting of:

a first customer data volume edge case containing at least 250 transactions per second (TPS) and a maximum of 2 million concurrently open records, a second customer data volume edge case containing a maximum of 15 transactions per second (TPS) and a maximum of 2 million concurrently open records, and a third customer data volume edge case containing a maximum of 15 transactions per second and at least 100 million concurrently open records, wherein the detecting comprises comparing the customer data volume and the transaction throughput requirements to the number of transactions per second (TPS) and the number of concurrently open records associated with the plurality of customer data volume edge cases;

calculate, using the customer data volume, a quantity of operational memory for the first server for the detected customer data volume edge case and modify the quantity of memory resources for the first server based on the calculated operational memory, wherein the modified quantity of memory resources are to be implemented in the first server during the real-time transactional processing; and operate the first server for the detected customer data volume edge case with the modified quantity of memory resources.

15. The computer program product of claim 14, where the detected customer data volume edge case comprises the third customer data volume edge case, and where the computer readable program code when executed on the server sizing computer further causes the server sizing computer to:

calculate a quantity of central processing unit (CPU) cores for the first server; and output the calculated quantity of CPU cores as an edge-case server hardware CPU sizing specification of the first server that is being designed to operate during real time with the database.

16. The computer program product of claim 15, where the customer data volume comprises a number of customer records and where, in causing the server sizing computer to calculate the quantity of CPU cores for the first server, the computer readable program code when executed on the server sizing computer causes the server sizing computer to:
calculate the quantity of CPU cores for the first server using a percentage-based scaling of a CPU core count that increments based upon the number of customer records.

17. The computer program product of claim 14, where the detected customer data volume edge case comprises the third customer data volume edge case, the customer data volume comprises a number of customer records, and where, in causing the server sizing computer to calculate the quantity of operational memory for the first server, the computer readable program code when executed on the server sizing computer causes the server sizing computer to:
calculate the quantity of operational memory for the first server using the customer data volume as the number of customer records multiplied by an amount of operational memory per million customer records multiplied by a RAMAdjustmentFactor, where the RAMAdjustmentFactor applies a decreasing percentage adjustment to the calculated quantity of operational memory as the customer data volume increases per million customer records.

18. The computer program product of claim 17, where the decreasing percentage adjustment of the RAMAdjustmentFactor comprises a decreasing percentage adjustment to the calculated quantity of operational memory from thirty percent (30%) at one hundred million (100M) customer records down to ten percent (10%) as the customer data volume increases per hundred million customer records, and the RAMAdjustmentFactor remains constant at ten percent (10%) beginning with one point one billion (1.1B) customer records.

19. The computer program product of claim 14, where the detected customer data volume edge case comprises the first customer data volume edge case, and where, in causing the server sizing computer to calculate the quantity of operational memory for the first server, the computer readable program code when executed on the server sizing computer causes the server sizing computer to:
determine that the quantity of memory resources for the first server is greater than a size of the database; and
adjust the quantity of memory resources to the size of the database.

20. The computer program product of claim 14, where the detected customer data volume edge case comprises the second customer data volume edge case, and where, in causing the server sizing computer to calculate the quantity of operational memory for the first server, the computer readable program code when executed on the server sizing computer causes the server sizing computer to:
determine that the quantity of memory resources for the first server is less than sixteen gigabytes (<16 GB); and
adjust the quantity of memory resources to sixteen gigabytes.

* * * * *